(12) United States Patent
Medasani et al.

(10) Patent No.: US 7,778,466 B1
(45) Date of Patent: Aug. 17, 2010

(54) SYSTEM AND METHOD FOR PROCESSING IMAGERY USING OPTICAL FLOW HISTOGRAMS

(75) Inventors: Swarup Medasani, Thousand Oaks, CA (US); Yuri Owechko, Newbury Park, CA (US)

(73) Assignee: HRL Laboratories, LLC, Malibu, CA (US)

( * ) Notice: Subject to any disclaimer, the term of this patent is extended or adjusted under 35 U.S.C. 154(b) by 1176 days.

(21) Appl. No.: 11/004,501

(22) Filed: Dec. 2, 2004

Related U.S. Application Data

(60) Provisional application No. 60/526,497, filed on Dec. 2, 2003.

(51) Int. Cl.
*G06K 9/48* (2006.01)
(52) U.S. Cl. ................ 382/199; 382/181; 382/203
(58) Field of Classification Search ........ 382/181, 382/231, 103, 106, 107
See application file for complete search history.

(56) References Cited

U.S. PATENT DOCUMENTS 3,069,654 A 12/1962 Hough
5,157,732 A * 10/1992 Ishii et al. .............. 382/107
6,263,089 B1 * 7/2001 Otsuka et al. ........... 382/107
6,597,738 B1 * 7/2003 Park et al. .......... 375/240.16
6,879,731 B2 * 4/2005 Kang et al. ............. 382/274
7,085,401 B2 * 8/2006 Averbuch et al. ........ 382/103

OTHER PUBLICATIONS

G.P. Stein, O. Mano and A. Shashua, "A Robust Method for Computing Vehicle Ego-motion," IEEE Intelligent Vehicles Symposium (IV 2000), Oct. 2000, Dearborn, MI.
J. Weber, J. Malik, "Rigid Body Segmentation and Shape Description from Dense Optical Flow Under Weak Perspective," IEEE Transactions on Pattern Analysis and Machine Intelligence 19(2), 139-143 (1997).

* cited by examiner

*Primary Examiner*—Brian Q Le
*Assistant Examiner*—Edward Park
(74) *Attorney, Agent, or Firm*—Tope-McKay & Assoc.

(57) ABSTRACT

A method, computer program product, and system for processing imagery is presented. The imagery is processed by receiving data regarding a scene (such as from a sensor monitoring a scene). The scene includes an object having a dimension. Flow vectors are computed from the data, while a flow histogram space is generated from the flow vectors. A line segment (with a length) is found within the flow histogram space. An object in the scene is associated with the length segment, and the dimensions of the object are estimated based on the length of the line segment.

60 Claims, 13 Drawing Sheets

Pcsflowmod3.m
tz = 10 km/hr
$\omega_x$ = 0 deg/sec
$\omega_y$ = 0 deg/sec
Zt = 12 meters
Ut = 0 m/sec
width = 2 meters Forward host motion with no yaw or pitch Stationary 2 meter wide object (i.e., target) at a 12 meter range

SYSTEM AND METHOD FOR PROCESSING IMAGERY USING OPTICAL FLOW HISTOGRAMS

PRIORITY CLAIM

This application is a non-provisional application, claiming the benefit of priority to provisional application No. 60/526,497, filed in the United States on Dec. 2, 2003, and titled "Video Object Segmentation from a Moving Host Using Optical Flow Histograms."

BACKGROUND OF THE INVENTION (1) Technical Field

The present invention relates to techniques for processing imagery. More specifically, the present invention relates to a technique for processing imagery by transforming optical flow maps into optical flow histograms and utilizing the histograms to determine positions and widths of objects in a scene.

(2) Description of Related Art

In the automotive market, the presence of active and passive safety systems is a critical factor in a buyer's acceptance of new vehicles released into the market. In addition, regulatory requirements prescribe a minimum standard for safety in the vehicle. Both factors have driven the spread of new technologies for use in automobile safety, such as pedestrian and vehicle detection. Future regulatory requirements may demand automobiles to actively avoid or mitigate collisions with vehicles and pedestrians, which will necessitate the development of pre-crash sensing systems.

In order for pre-crash sensing systems to be effective, they need to segment the objects in a scene being monitored in order to predict potential collisions with a vehicle (i.e., host). Object segmentations created using existing optical flow methods are often noisy, inconsistent, and sparsely sampled, particularly if a host platform is moving.

Previously, optical flow fields have been used for moving object segmentation. A recent approach modeled the road in front of the host vehicle as a planar surface; estimated the ego-motion using some simple assumptions; compensated the ego-motion using this simple model; and then detected the foreground objects.

Unfortunately, the optical flow field method is computationally expensive and cannot currently be implemented in real-time without using specialized hardware. Another drawback is that this method is not robust against violations of the planar road model constraint.

Another moving object segmentation approach involves heuristic attempts to compensate for motion between two contiguous frames by first compensating for pitch and then yaw motion. Akin to video stabilization, compensating for pitch and yaw motion is designed to eliminate background flow, thus exposing the foreground objects with simple differencing. A drawback is that this approach is not very robust and fails when the motion vectors are not small.

Yet another approach for moving object segmentation involves using epi-polar constraints for segmenting objects. This approach is not feasible in real-time and involves computation of the fundamental matrix which is not stable for the slow motions that are typically observed in optical flow.

Thus, what is needed is a system and method for processing imagery, wherein the system and method is not limited to a planar road model constraint, is more robust, is adaptable to larger motion vectors, and is computationally efficient enough to be performed in real-time.

SUMMARY OF INVENTION

The present invention relates to method, system, and computer program product for processing imagery. The system and computer program product are configured to perform acts of receiving data regarding a scene, the scene comprising an object having a dimension; computing flow vectors from the data; generating a flow histogram space from the flow vectors; finding a line segment within the flow histogram space, the line segment having a length; associating an object in the scene with the line segment; and estimating the dimension of the object based on the length of the line segment.

In the act of computing comprises utilizing a pyramidal version of the Lucas-Kanade (LKP) approach to compute the flow vectors.

The present invention further comprises an act of operating a modified median filter on the flow histogram space to eliminate isolated non-zero bins.

In another aspect, the act of finding a line segment is performed via a Hough transform.

In yet another aspect, the act of estimating the dimension of the object is performed using heuristic models.

Furthermore, in the act of computing flow vectors, the flow vectors are computed as either horizontal or vertical components of flow.

Additionally, in the act of generating flow histograms, the histograms are generated as either horizontal or vertical projection histograms.

BRIEF DESCRIPTION OF THE DRAWINGS

The objects, features and advantages of the present invention will be apparent from the following detailed descriptions of the various aspects of the invention, in conjunction with reference to the following drawings, where.

DETAILED DESCRIPTION

Figure 1:
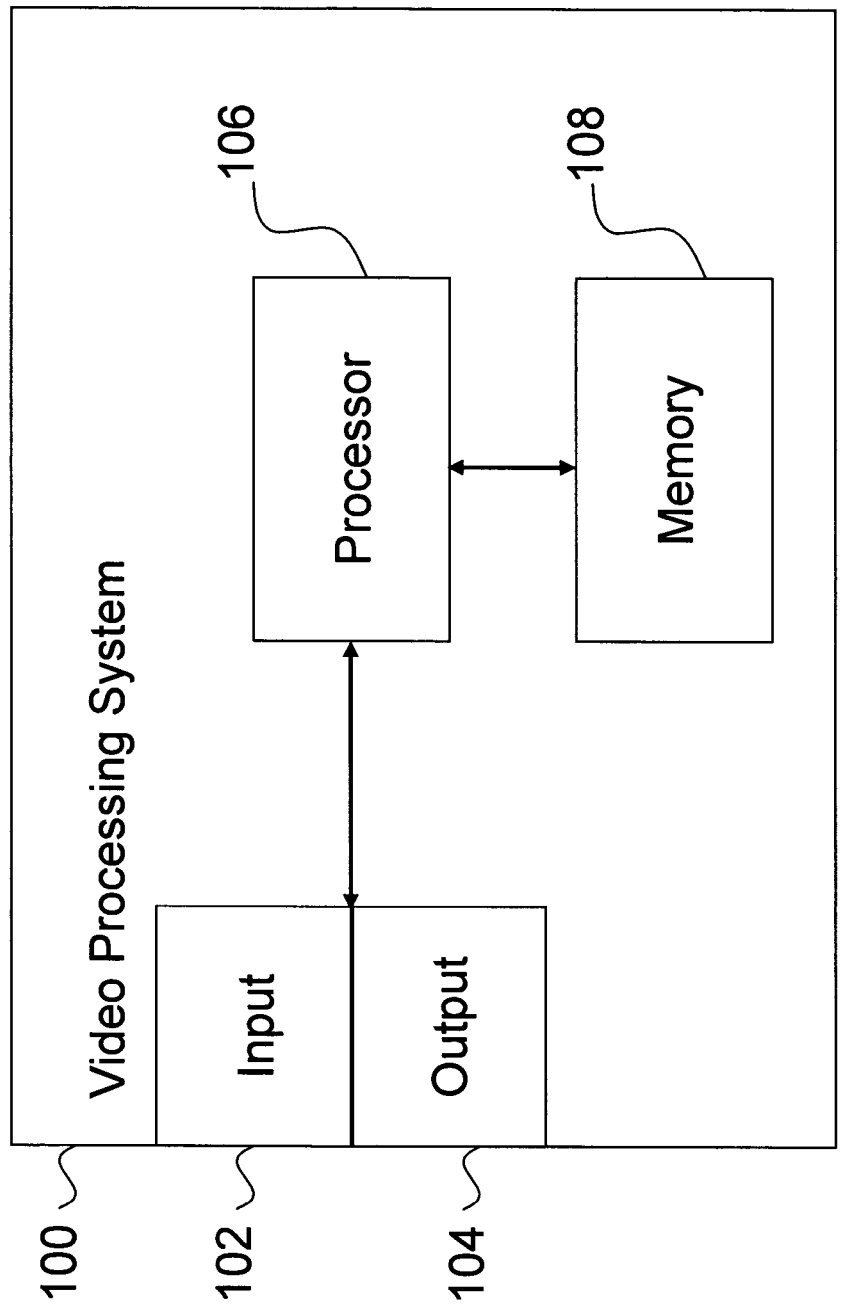
FIG. 1 is a block diagram of a data processing system used in conjunction with the present invention.

The present invention relates to techniques for processing imagery. More specifically, the present invention relates to a technique for processing imagery by transforming optical flow maps into optical flow histograms and utilizing the histograms to determine positions and widths of objects in a scene.

The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of embodiments. Thus, the present invention is not intended to be limited to the embodiments presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

In order to provide a working frame of reference, first a glossary of terms used in the description and claims is given as a central resource for the reader. Next, a description of various principal aspects of the present invention is provided. Third, an introduction is provided to provide the reader with a brief understanding of the present invention. Finally, a discussion of various aspects of the present invention is provided to give an understanding of the specific details.

(1) Glossary

Before describing the specific details of the present invention, a glossary is provided in which various terms used herein and in the claims are defined. The glossary provided is intended to provide the reader with a general understanding for the intended meaning of the terms, but is not intended to convey the entire scope of each term. Rather, the glossary is intended to supplement the rest of the specification in more accurately explaining the terms used.

Heuristic Models—The term "heuristic models" refers to a problem-solving technique in which the most appropriate solution of several found by alternative methods is selected at successive stages of a program for use in the next act of the program. As applied to the present invention, a heuristic model can be used to estimate the dimensions of an object in an image. Specific examples of the heuristic models used in the present invention are discussed in further detail below in the section entitled, "Object Dimension Estimation."

Hough Transform—The term "Hough Transform" refers a technique used in image analysis that allows recognition of global patterns in an image space by recognition of local patterns (ideally a point) in a transformed parameter space.

Instruction Means—The term "instruction means" as used with respect to this invention generally indicates a set of operations to be performed on a computer, and may represent pieces of a whole program or individual, separable, software modules. Non-limiting examples of "instruction means" include computer program code (source or object code) and "hard-coded" electronics (i.e. computer operations coded into a computer chip). The "instruction means" may be stored in the memory of a computer or on a computer readable medium such as a floppy disk, a CD-ROM, and a flash drive.

Lucas-Kanade—The term "Lucas-Kanade (LK)" refers to a technique for solving a linear system using information around a good feature point for the optical flow.

Pyramidal Lucas-Kanade—The term "Pyramidal Lucas-Kanade (LKP)" refers to a technique that expands upon the LK approach, utilizing a pyramid of the input frames to compute flow at different levels using a fixed size neighborhood, where flow computed at coarser levels is then propagated to finer resolution levels. At each level, the LK algorithm is used to compute the flow field and to propagate the flow value to the next level. This process is repeated for all of the good feature points resulting in the flow field.

(2) Principal Aspects

The present invention has three "principal" aspects. The first is an image processing system. The image processing system is typically in the form of a computer system operating software or in the form of a "hard-coded" instruction set. This system may be incorporated into a wide variety of devices that provide different functionalities. The second principal aspect is a method, typically in the form of software, operated using a data processing system (computer). The third principal aspect is a computer program product. The computer program product generally represents computer readable code stored on a computer readable medium such as an optical storage device, e.g., a compact disc (CD) or digital versatile disc (DVD), or a magnetic storage device such as a floppy disk or magnetic tape. Other, non-limiting examples of computer readable media include hard disks, read-only memory (ROM), and flash-type memories. These aspects will be described in more detail below.

A block diagram depicting the components of an image processing system of the present invention is provided in FIG. 1. The image processing system 100 comprises an input 102 for receiving information from at least one sensor for use in detecting image intensity in a scene. Note that the input 102 may include multiple "ports." Typically, input is received from at least one sensor, non-limiting examples of which include video image sensors. An output 104 is connected with the processor for providing information regarding the presence and/or identity of object(s) in the scene to other systems in order that a network of computer systems may serve as an image processing system. Output may also be provided to other devices or other programs; e.g., to other software modules, for use therein. The input 102 and the output 104 are both coupled with a processor 106, which may be a general-purpose computer processor or a specialized processor designed specifically for use with the present invention. The processor 106 is coupled with a memory 108 to permit storage of data and software to be manipulated by commands to the processor.

Figure 2:
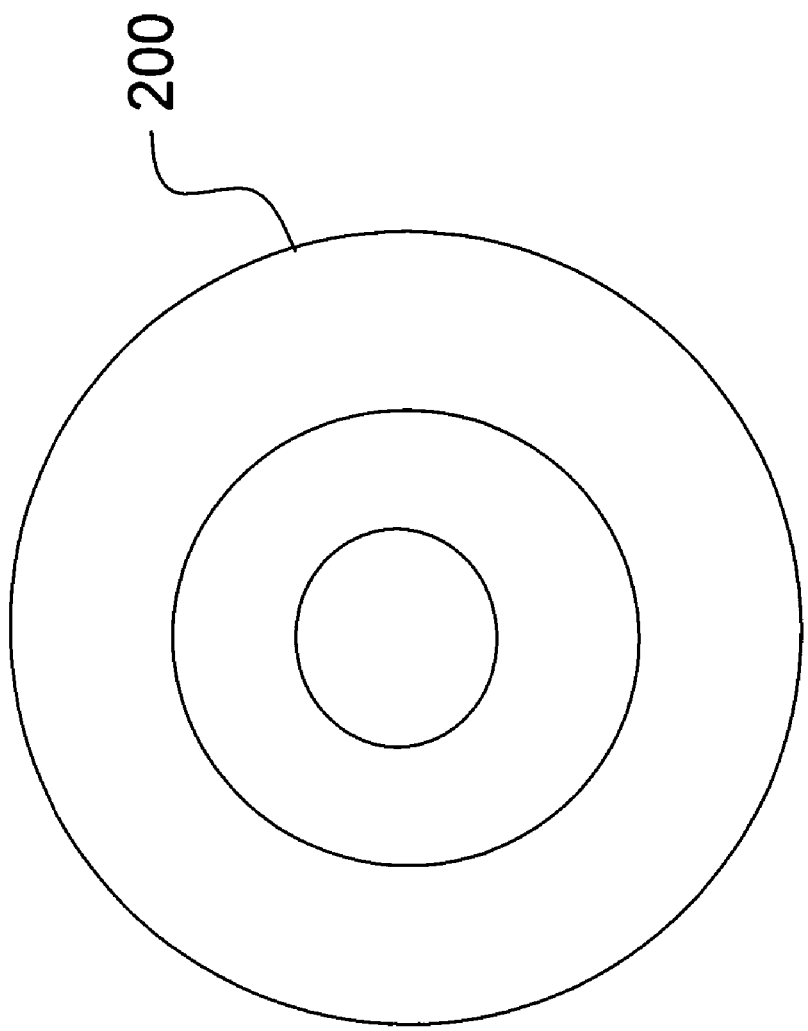
FIG. 2 is an illustrative diagram of a computer program product aspect of the present invention.

An illustrative diagram of a computer program product embodying the present invention is depicted in FIG. 2. The computer program product 200 is depicted as an optical disk such as a CD or DVD. However, as mentioned previously, the computer program product generally represents computer readable code stored on any compatible computer readable medium.

(3) Introduction

Before the details of the present system and method are discussed, an overview of the system and method is presented. This discussion outlines a system and method for processing imagery in order to robustly reveal the positions and widths of moving objects in a scene. The system also works when an image sensor is mounted on a moving platform, such as an automobile. As previously described, the capability to characterize moving objects from a moving platform is important for automotive pre-crash warning systems. The system and method described herein uses histograms of optical flow to determine the positions and dimensions of objects in the field of view.

As previously indicated, object segmentations created using existing optical flow methods are often noisy, inconsistent, and sparsely sampled; especially if the host platform (e.g., automobile) is moving. The present system and method overcomes these drawbacks by transforming two-dimensional (2-D) flow maps into 2-D flow histogram spaces. The flow histogram spaces integrate flow variations along rows or columns of the flow maps, thereby smoothing inconsistent object flow patterns and reducing noise. Experimental results show that the disclosed system and method can be employed for real-time (e.g., at least 15 frames per second (fps)) object segmentation.

Existing optical flow-based moving object segmentation methods often result in noisy and inconsistent flow patterns, especially if motion of the imaging sensor causes a large spatially-varying background component of optical flow. In order to meet requirements of pre-crash sensing systems, the disclosed system and method utilizes a 2-D flow histogram space to estimate the positions and dimensions of objects. Since the flow histogram space represents averaged or integrated flow information, it is more robust to noisy flow and is capable of filtering out inconsistent flow patterns. Also, compared to using conventional methods, using flow histogram space makes is easier to cluster the flow patterns corresponding to an object. Thus, the system and method described herein make it is easier to determine the number of objects in the scene.

The flow histogram space also provides a way of parsing the scene into layers wherein each layer corresponds to an object with a certain flow pattern. Thus, mobile objects in the scene can be separated from background flow. The disclosed system and method does not require knowledge of the number, size, or shape of the objects whose widths need to be estimated. One embodiment of the disclosed system and method runs at 15 fps on a conventional personal computer (PC), independent of the number of objects in the scene. While the disclosed system and method is explained in terms of pre-crash avoidance systems, one skilled in the art will appreciate that there are many other uses of the disclosed system and method including automated vision, surveillance systems, and security applications where real-time processing of imagery is important.

The present system and method provides a robust and computationally fast approach to estimating the positions and dimensions of moving objects in a scene (i.e., the field of view) of an image sensor, such as a video camera, which is itself moving. The disclosed system and method involves using a histogram space, comprising stacked histograms of optical flow vectors, to robustly estimate object dimensions. One skilled in the art will appreciate that optical flow vectors arising from moving objects in a real-world scene observed by a moving image sensor can be very noisy. The present invention receives data from the image sensor, computes raw optical flow maps, and transforms the information in the raw optical flow maps into a stacked optical flow histogram space that is less noisy, thereby enabling an accurate estimation of the positions and dimensions of objects. In simulations using the present invention, planar representations for the road, host vehicle, and other objects in the scene are assumed. However, as will be seen from experimental demonstrations, to be described later, the present invention is robust against violations of these assumptions.

Figure 3:
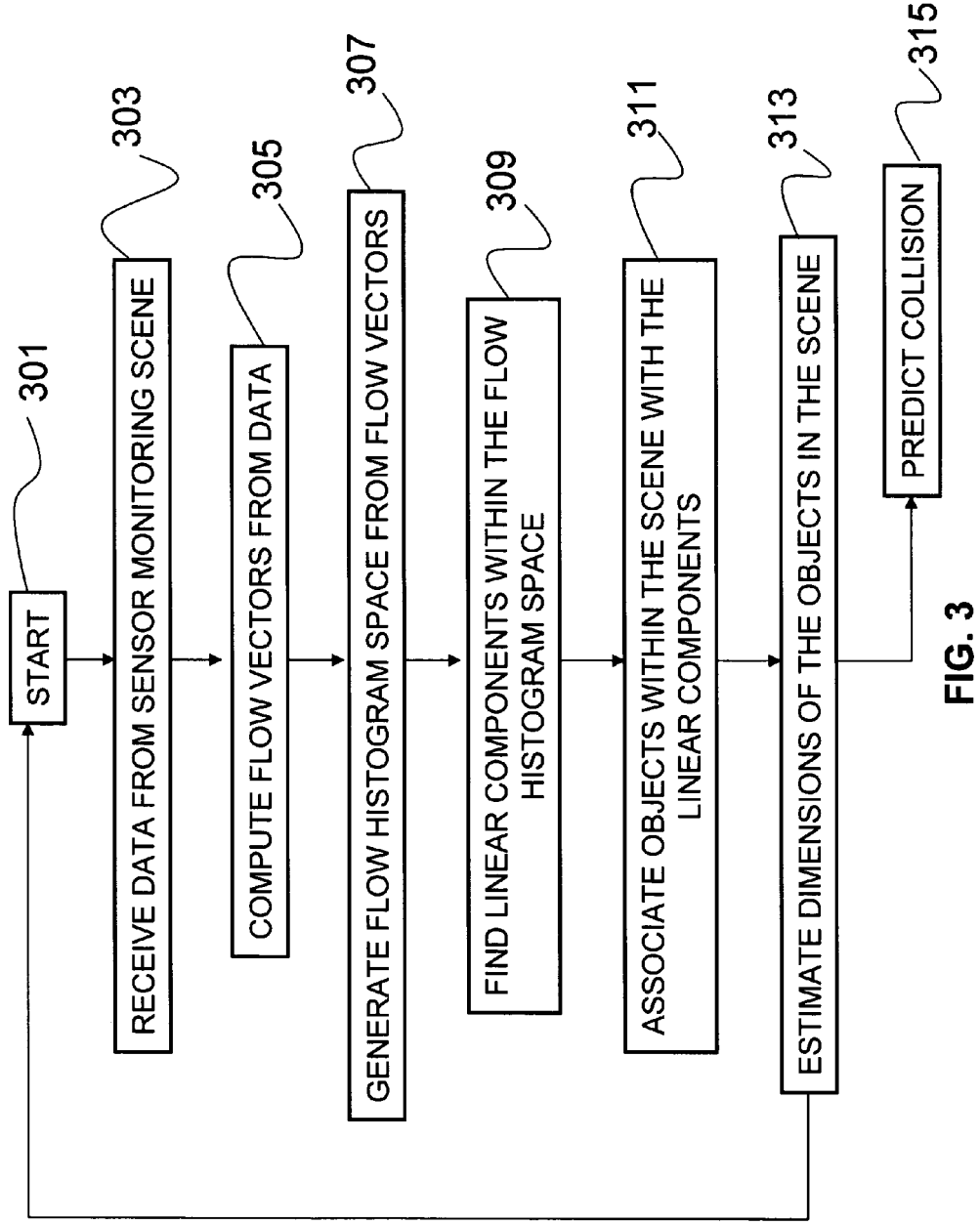
FIG. 3 is a block diagram illustrating the acts performed by the present invention.

A block diagram of the approach taken in the disclosed system and method is provided in FIG. 3. After starting 301 the system or method, a first act of receiving data from a sensor monitoring a scene 303 is performed. The received data is then used to perform an act of computing flow vectors 305 from the data. The flow vectors thus computed are utilized to perform an act of generating a flow histogram space 307. Next, within the flow histogram space, an act of finding linear components 309 is performed. After the act of finding linear components, an act of associating objects within the scene with the linear components 311 is performed. After the objects are associated, an act of estimating dimensions of the objects 313 in the scene is performed. If the present invention is utilized in a collision avoidance system (e.g., for an automobile), the system can use the estimated dimensions of the object to predict a collision 315 and react accordingly. This process is continuously repeated during the operation of the system and method.

(4) Description

This section expands on the Introduction above, providing greater detail regarding the operations of the disclosed system and method. In this example, although any type of sensor could be used for monitoring the scene and generating data regarding the scene, for illustrative purposes a video camera is used. A brief description of the modeling process is given below. The Z-axis of the world coordinate system is aligned with the image sensor optical axis and the X and Y-axes are aligned with the image axes x and y.

The camera translation and rotation are given by $(t_x, t_y, t_z)$ and $(\omega_x, \omega_y, \omega_z)$, respectively, where t is in applicable units and w is in radians per time. The velocity of a vector P (X,Y,Z), is given by the equation $$P = (t_x, t_y, t_z) + (\omega_x, \omega_y, \omega_z) \times (X, Y, Z).$$

P (X,Y,Z) is a point in the real world for the real world coordinates X, Y, and Z. The image coordinates corresponding to P are p(x,y). From the perspective transformation equations, and with pin-hole assumptions, a relation between P and p is $$x=fX/Z, y=fY/Z,$$

where f is the focal length of the lens being used by the imaging device, and where a pin-hole assumption means light rays going through the lens can be modeled by lines going from an object or illumination source though a small pinhole at the center of the lens. The paths of the light rays are modeled geometrically, while the wave nature and the lens distortions are ignored.

The flow vectors may be used computing $u=\dot{x}, v=\dot{y}$, wherein the equations for u, and v can then be written as, $$u = \left(-\frac{t_x f}{Z} - \frac{xt_z}{Z} + \omega_y f - \omega_z y - \frac{\omega_x xy}{f} + \frac{\omega_y x^2}{f}\right), \text{ and}$$

$$v = \left(-\frac{t_y f}{Z} - \frac{yt_z}{Z} - \omega_x f - \omega_z x + \frac{\omega_y xy}{f} + \frac{\omega_x y^2}{f}\right).$$

The above expressions may be simplified by assuming planar surfaces, translation along camera Z-axis, and rotation around the X and Y-axes only. This assumption reduces the above equations to $$u = -bxyt_z - \frac{xy}{f}\omega_x + \left(f + \frac{x^2}{f}\right)\omega_y, \text{ and}$$

$$v = -by^2 t_z - \frac{xy}{f}\omega_y - \left(f + \frac{y^2}{f}\right)\omega_x,$$

where, b=1/fH and f is the focal length of the lens being used and H is the height of the camera from the ground plane.

Figure 4:
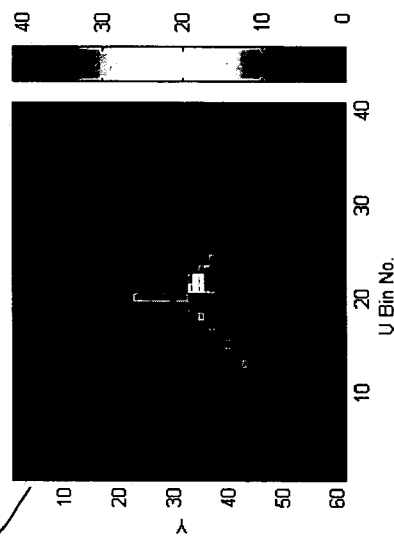
FIG. 4 is an example of a Matlab® simulation of optical flow and flow histograms according to the present invention.
Figure 4:
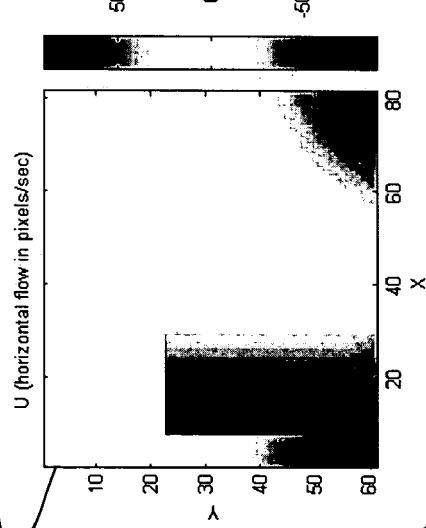
Figure 4:
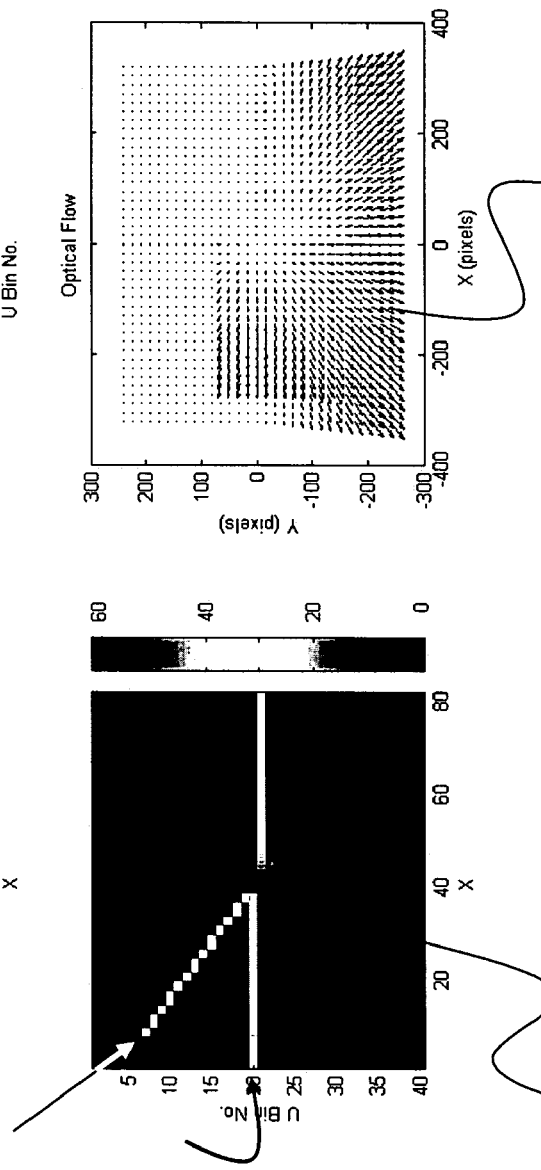

Using the above equations along with a Matlab® program, the effect of host and target velocities, widths, etc., on the flow vectors and the corresponding flow histogram space was simulated. An example of the scene configuration, host and target attributes, the estimated flow, and the corresponding flow histogram space is shown in FIG. 4 for a stationary object (i.e., target) 2 meters wide sitting on a ground plane 12 meters from the camera (i.e., host). The host in the simulated configuration is moving (tz) at 10 kilometers per hour (with no pitch ($\omega_x$) or yaw ($\omega_y$)), and the background is assumed to be beyond 50 meters. Also as illustrated in FIG. 4, Zt represents the distance from the host to the target; and Ut represents the velocity of the target in relation to the host.

Given the U component optical flow map 401 in FIG. 4, the horizontal and vertical flow vector components along both the horizontal and vertical directions are projected by combining a series of row and column one-dimensional (1-D) histograms to form two-dimensional (2-D) histogram spaces. The optical flow field 407 showing flow vectors at each pixel due to the moving host is depicted in FIG. 4. Each row or column of the U component optical flow map 401 is used to generate a horizontal flow histogram 403 or a vertical flow histogram 405 corresponding to that row or column. In the horizontal flow histogram 403, the x-axis is the number of bins chosen for the histogram and the y-axis corresponds to the rows in the image. In the vertical flow histogram 405, the x-axis corresponds to the columns of the image and the y-axis is the number of bins chosen for the histogram.

FIG. 4 illustrates that a moving host induces optical flow on a stationary object that can be represented by a diagonal line 409 in the vertically projected histogram space 405. In the vertically projected histogram space 405, the y-axis is the number of histogram bins and the x-axis is the width of the image. Optical flow from the rest of the scene is represented by a horizontal line 411 in the same vertical flow histogram space 405. An approach to finding the various line segments 409 and 411, in the vertical flow histogram space 405 can be used to find the positions and dimensions (e.g., such as widths) of objects in the scene. Note that the dimension of an object is directly correlated to the extent of the line segments 409 and 411 in the flow histogram space 405. The above theoretical result makes several strong assumptions about the object properties such as rigid bodies, dense flow maps, etc. In practice, these assumptions are violated and the histogram space is noisier.

The following description highlights several of the acts described above and shown in FIG. 3. While one skilled in the art will appreciate that there are many ways to perform the acts described above, the following description provides insight into a particular approach for implementing the present invention.

(a) Robust Flow Computation

There are various approaches for quickly and reliably computing optical flow from data that is received from a sensor. Four exemplary approaches are block-matching (BM), Horn-Schunk, Lucas-Kanade (LK) and a pyramidal version of the Lucas-Kanade (LKP) approach. Each of the approaches was tested on sequences of scenarios with pedestrians. Both the BM and LK approaches use a pre-specified size for the neighborhood regions around feature points. One result of the BM and LK approaches is that these neighborhood regions are too small when objects are close and too large when objects are further away. A pyramidal version of the LK approach (LKP) does not exhibit this result.

The LKP utilizes a pyramid of the input frames to compute flow at different levels using a fixed-size neighborhood. The flow computed at coarser levels is then propagated to finer resolution levels. The LKP approach was tested with several scenes involving pedestrians and cars. The following outlines the LKP approach.

To provide a better understanding of the LKP approach, the LK approach will first be explained. Frames A(x,y) and B(x, y) are taken at times t and t+1 respectively. The goal is to compute a flow field between the two images. The image brightness constancy equation I(x(t), y(t),t)=I(x(t+dt), y(t+dt),t+dt) is employed to obtain the optical flow field 401 of FIG. 4. I is an image from any given frame, such as A or B, etc. The image brightness equation is indirectly used to compute the flow filed in a moving scene. Note that the optical flow field 401 is an approximation of the motion field (i.e., the 2-D flow field generated by corresponding points moving in 3-D space) under the following simple assumptions: Lambertian surface; point-wise light source at infinity; and no photometric distortion. One skilled in the art will appreciate that the difference between the optical flow field 401 and the actual motion field is smaller in regions where the edge gradient magnitudes are higher. The LK approach tries to minimize an error function in the neighborhood of a good feature point in the image. At this stage, it is important to define good feature points. Typically, regions with high gradient information and regions with corners usually satisfy the requirements of good feature points. The basic algorithm to obtain a list of good feature points whose optical flow field 401 needs to be found involves finding the covariance matrix of every region in the image. Note that the region size is decided a priori. Since covariance matrices are symmetric and at least positive semi-definite, both the eigen values are greater than or equal to zero. The eigen vectors indicate the directions of the corners and the magnitude of the eigen values indicate the strength of the edges in the corresponding directions. Ideally, regions with strong corners enable object detection. Thus, points where the smaller eigen value is larger than a chosen threshold are used. The chosen threshold is determined as a percentage of the largest eigen value.

A list of feature points where the smaller eigen value is larger than the chosen threshold is determined. Then, for each of the feature points in the list, the LK approach is invoked. The error function ($\epsilon(\bar{v})$) that is typically minimized in a 2-D neighborhood (2-D nbhd) around a good feature point is:

$$\varepsilon(\bar{v}) = \varepsilon(v_x, v_y) = \sum_{2-D-nbhd} (A(x, y) - B(x + v_x, y + v_y))^2,$$

where, $\bar{v} = (v_x, v_y)$ are the components of the flow vector that is being computed at the point (x,y). Taking the first derivative of the above equation results in $$\frac{\partial \varepsilon}{\partial \bar{v}} = -2 \sum_{2-D-nbhd} (A(x, y) - B(x + v_x, y + v_y)) \begin{bmatrix} \frac{\partial B}{\partial x} & \frac{\partial B}{\partial y} \end{bmatrix}. \quad (1)$$

Substituting $B(x+v_x,y+v_y)$ into equation (1) by its Taylor's approximation results in, $$\frac{1}{2} \left[ \frac{\partial \varepsilon(\bar{v})}{\partial \bar{v}} \right]^T = \sum_{2-D-nbhd} (\nabla I^T \bar{v} - \delta I) \nabla I^T \text{ where,}$$

$$\nabla I = \begin{bmatrix} \frac{\partial B}{\partial x} & \frac{\partial B}{\partial y} \end{bmatrix} \text{ and } \delta I = (A(x, y) - B(x, y)).$$

The above set of equations can be further simplified and written as a linear system, $$\frac{1}{2} \left[ \frac{\partial (\bar{v})}{\partial \bar{v}} \right]^T = G\bar{v} - \bar{b}, \text{ where,}$$

$$G = \sum_{2-D-nbhd} \begin{bmatrix} I_x^2 & I_x I_y \\ I_x I_y & I_y^2 \end{bmatrix}, \text{ and, } \bar{b} = \sum_{2-D-nbhd} \begin{bmatrix} \delta & I & I_x \\ \delta & I & I_y \end{bmatrix},$$

and where $I_x$, $I_y$ are the spatial gradients of image B along the x and y-axes respectively, and $\delta I$ is as defined above.

The solution to the optimal flow vector is then given as $\bar{v}_{opt} = G^{-1} \bar{b}$.

Thus, the LK approach solves a linear system using information around a good feature point for the optical flow. The use of the information from a neighborhood allows it to tackle the aperture problem that commonly occurs in flow-based methods.

The LKP approach employs the basic LK algorithm at different levels of the image. The original images are converted into a pyramid at different levels. Processing continues from the coarsest level to the level of resolution of the original image. At each level, the LK algorithm is used to compute the flow field and to propagate the flow value to the next level. This process is repeated for all of the good feature points resulting in the flow field. Thus, moving planar objects in the scene are represented by quadratic polynomials in the flow field image.

A more detailed description of the pyramidal version of the Lucas-Kanade approach and selecting good features is given in the following references: "Pyramidal implementation of the Lucas-Kande feature tracker: Description of the Algorithm," by Jean-Yves Bouguet, Technical report, Intel Corporation, Microprocessor Research Labs, OpenCV documents (1999); and "Good Features to Track," by J. Shi and C. Tomasi, 1994 IEEE Conference on Computer Vision and Pattern Recognition (CVPR '94), 1994, pp. 593-600.

(b) Flow Histograms

Once the apparent flow field is computed, the next step is to convert the 2-D flow field into a flow histogram space. A flow histogram space can be computed from flow vectors along each column or row in the 2-D flow field. The computed flow histogram space would reveal the frequency of flow vectors of varying magnitudes. The goal is to elicit information about coherent flow patterns from noisy flow maps. The optical flow field consists of a horizontal and vertical component, and since flow histogram spaces can be computed in two directions, there are a total of four projections. In FIG. 5B, four flow histograms 509, 511, 513 and 515 are depicted, generated from the 2-D flow maps 505 and 507 shown in FIG. 5A. Although, each of the four flow histograms 509, 511, 513, and 515 has unique information about the coherent flow in the scene, in one embodiment for pre-crash collision avoidance, the emphasis is on estimating the width from the horizontal component column-wise flow histogram. Shown in FIG. 5B, the background flow is modeled by a horizontal line 515 and the object flow by a diagonal line 517.

As an optional processing step, a modified median filter is run on the flow histograms 509, 511, 513, and 515 to eliminate isolated non-zero bins. For each non-zero bin, q, in the stacked histogram image, the number of other non-zero bins in a small neighborhood is counted. If the number of non-zero bins is less than an empirical threshold, then the histogram bin, q, is set to zero. This modified median filtering technique eliminates a lot of the spurious and noisy bins from the stacked histogram images.

(c) Hough Transform

After the flow histogram space is computed, the next act is finding the linear components. In one embodiment, a Hough Transform (HT) is utilized to find linear segments in the flow histogram space. The Hough transform is a standard tool in image analysis that allows recognition of global patterns in an image space by recognition of local patterns (ideally a point) in a transformed parameter space. The basic idea of this technique is to find curves that can be parameterized like straight lines, polynomials, circles, etc., in a suitable parameter space. A noteworthy characteristic of the HT is that it does not require the connectedness of the co-linear points. Segmented lines will generate a peak in the parameter space and the lacking segments simply do not contribute to the transform. On the other side, artifact peaks might be generated in the presence of noise and a high-density of features by coincidental intersections in the parameter space. To a certain extent, artifacts can be avoided by using anti-aliasing techniques and adapted peak finding algorithms. Also, the HT treats each image point independently, allowing for a parallel implementation of the method.

(d) Object Dimension Estimation

The next act involves estimating object dimensions. The HT provides the slope of the linear segments in the flow histogram space. Since each of the linear segments corresponds to an object in the scene, finding the extent of flow vectors along any particular segment allows for estimating the object boundary and thereby its dimensions, such as width. In some applications, the process may be more difficult, since dense flow is not always guaranteed. Also, poor texture in the object might result in the linear segment corresponding to an object to be broken into several smaller segments with holes in-between. In these cases, heuristic models can be used to accurately estimate the dimensions of the objects.

In one embodiment, simple heuristic rules are employed to extract object dimensions robustly. When the host is not moving, all linear segments in the flow histogram space correspond to a moving object in the scene. The parameters of the linear segments may be extracted and then the means of the points close to the linear segments may be computed. For each segment, the line from the mean position is traversed in an effort to find the object boundaries. The search process is stopped when a hole in the line segment is significantly larger than the size of the segment traversed.

In the case of a moving host, an additional segment may appear due to the apparent motion of the scene background. Thus, finding and eliminating points close to the line segment associated with the background pixels in the scene may be performed to eliminate this additional segment. The rest of the process is the same as in the case of a non-moving host.

(e) Experimental Results

The following screen shots shown in FIGS. 5-9, illustrate performance of the present invention on a variety of sequences. It can be appreciated by one skilled in the art that FIGS. 5-9 are for illustrative purposes only and that the present invention can be employed to process a variety of imagery in a variety of circumstances.

Figure 5A:
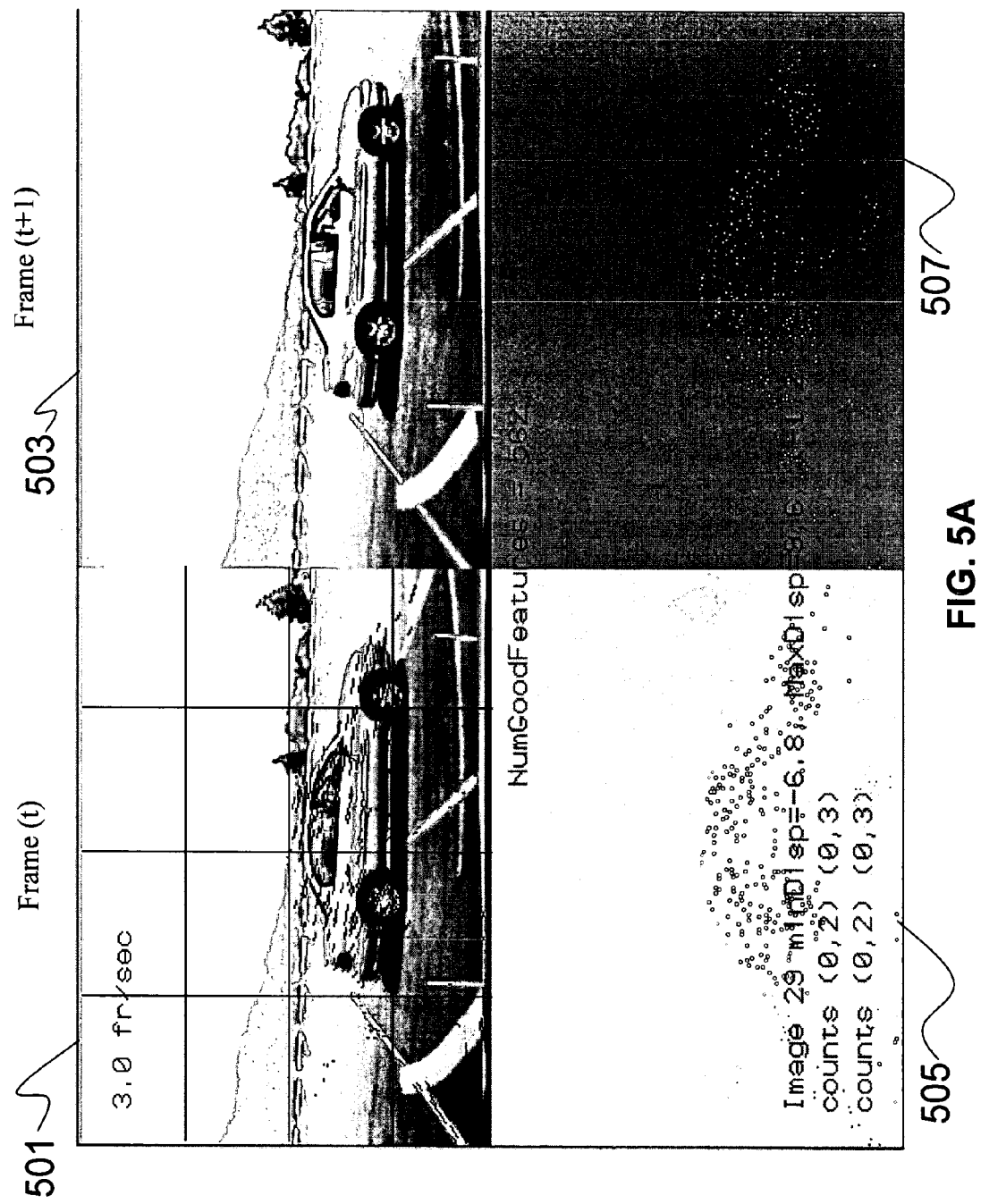
FIG. 5A is an exemplary sequence of two frames where a host and target were moving away from each other, illustrating flow vectors according to the present invention.
Figure 5B:
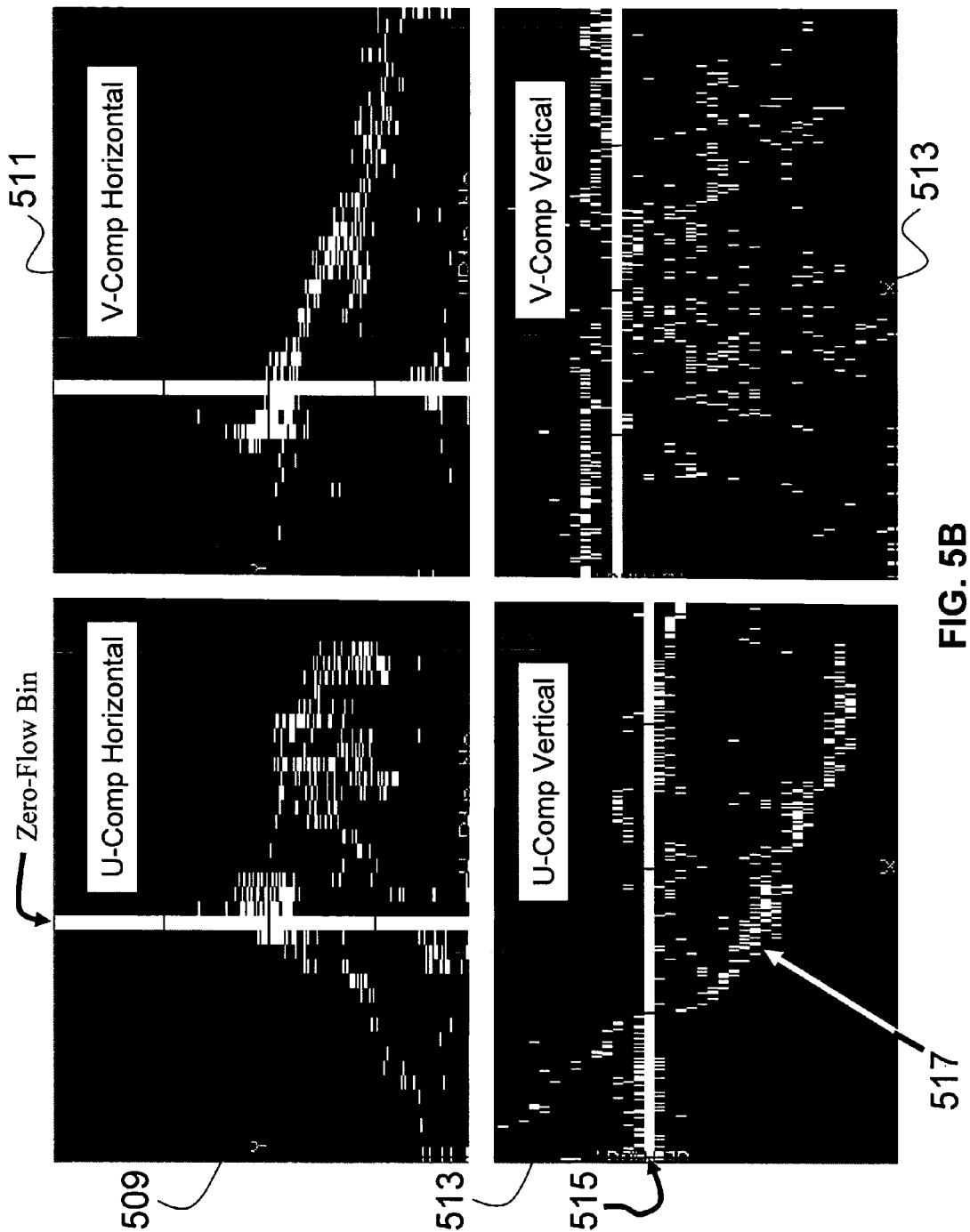
FIG. 5B is an exemplary flow histogram of the flow vectors shown in FIG. 5A, illustrating horizontal and vertical flow components, projected in both vertical and horizontal directions.

Shown in FIG. 5A are two frames 501 and 503 from a sequence where the host and target are moving away from each other. Frames 509, 511, 513, and 515 are projections of the horizontal and vertical flow components along both vertical and horizontal directions.

Figure 6A:
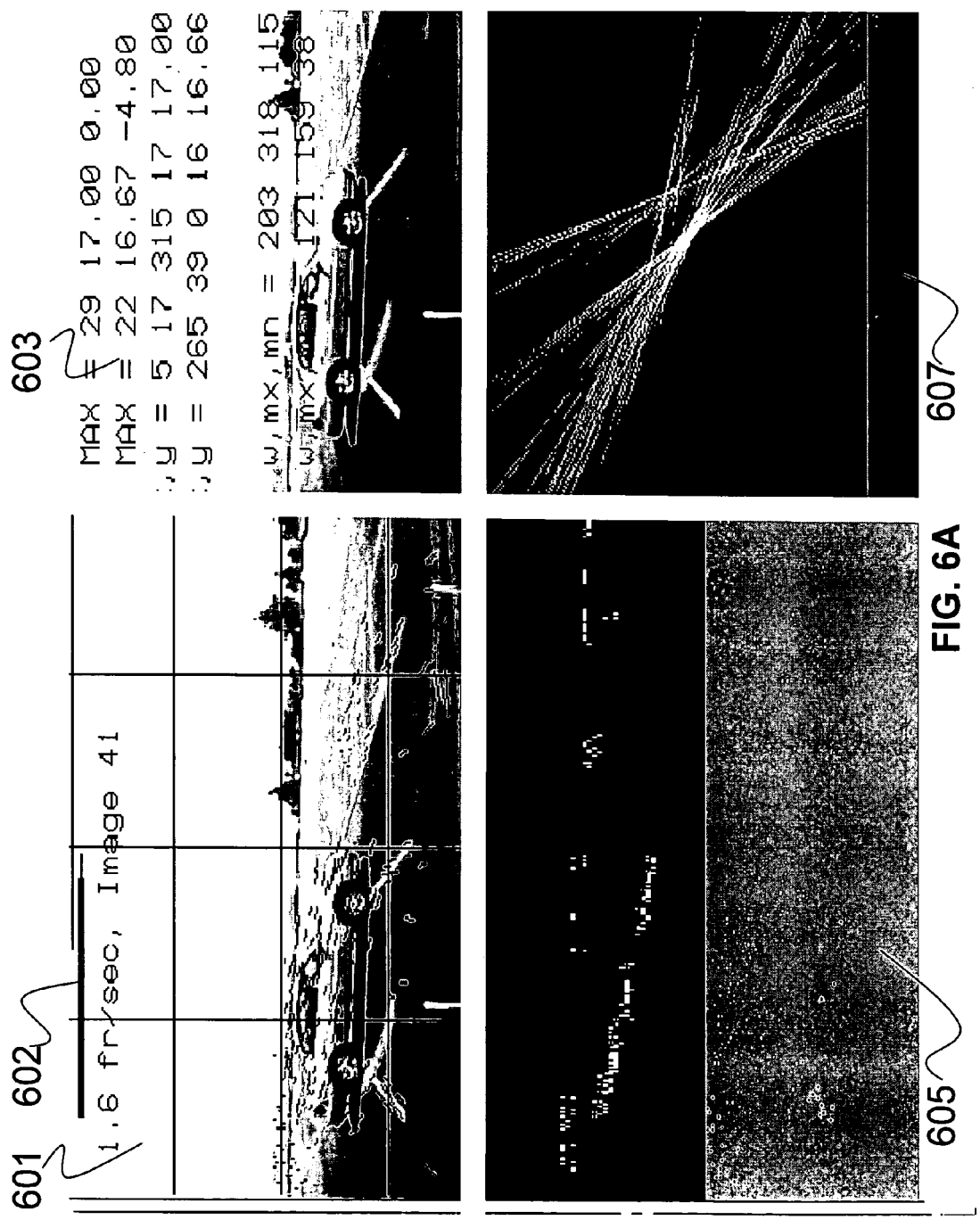
FIG. 6A is an exemplary sequence of two frames where a host and target were moving away from each other while the target also moved across the field of view; a Hough parameter space derived from the two frames; and linear segments in a flow histogram space.

FIG. 6A illustrates the Hough parameter space 605 and the linear segments in the flow histogram space 607 for the two frames in the sequence 601 and 603. In FIG. 6A, the two frames 601 and 603 were taken when the target and host were moving away from each other, while the target was also moving across the scene. An estimate of the object width 602 is plotted on the top left quadrant of the figure. In this embodiment, the width estimate of the object is extracted from the extent of the line using some heuristic rules to account for non-continuous lines, noise, and other issues.

Figure 6B:
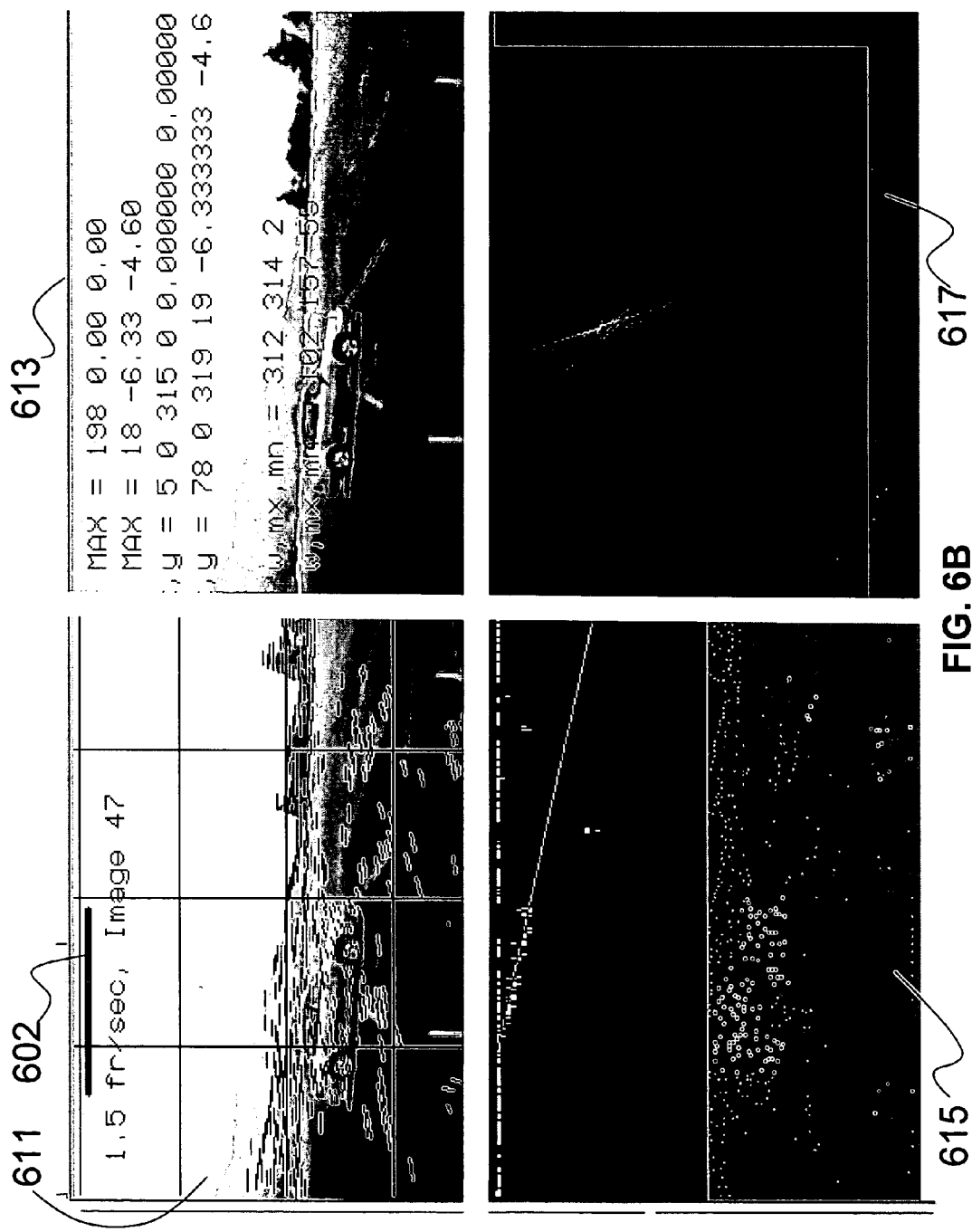
FIG. 6B is an exemplary sequence of two frames where a host and target were moving away from each other while the target also moved across the field of view; a Hough parameter space derived from the two frames; and linear segments in a flow histogram space.

As shown in FIG. 6B, for the two frames in the sequence 611 and 613, the Hough parameter space 615, and the linear segments in the flow histogram space 617 are shown. In FIG. 6B, the two frames 611 and 613 were taken when the target and host were moving away from each other, while the target was also moving across the scene. The frames 611 and 613 are different from frames 601 and 603 in that in frames 611 and 613, the host and object were further away from each other than they were in frames 601 and 603. In this embodiment, the width estimate 602 of the object is extracted from the extent of the line using some heuristic rules to account for non-continuous lines, noise, and other issues.

Figure 7A:
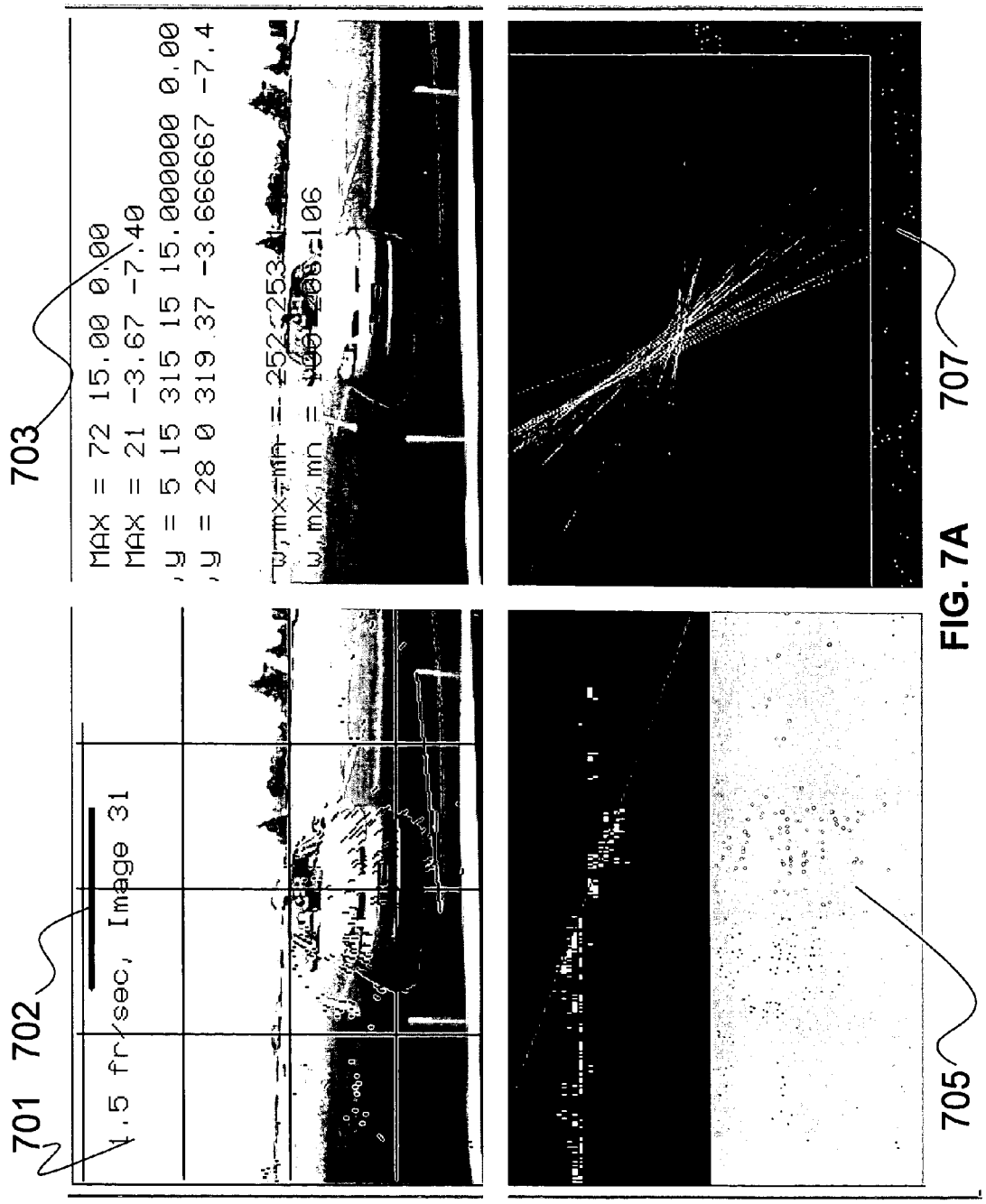
FIG. 7A is an exemplary sequence of two frames where a host and target were diverging relative to each other; a Hough parameter space derived from the two frames; and linear segments in a flow histogram space.
Figure 7B:
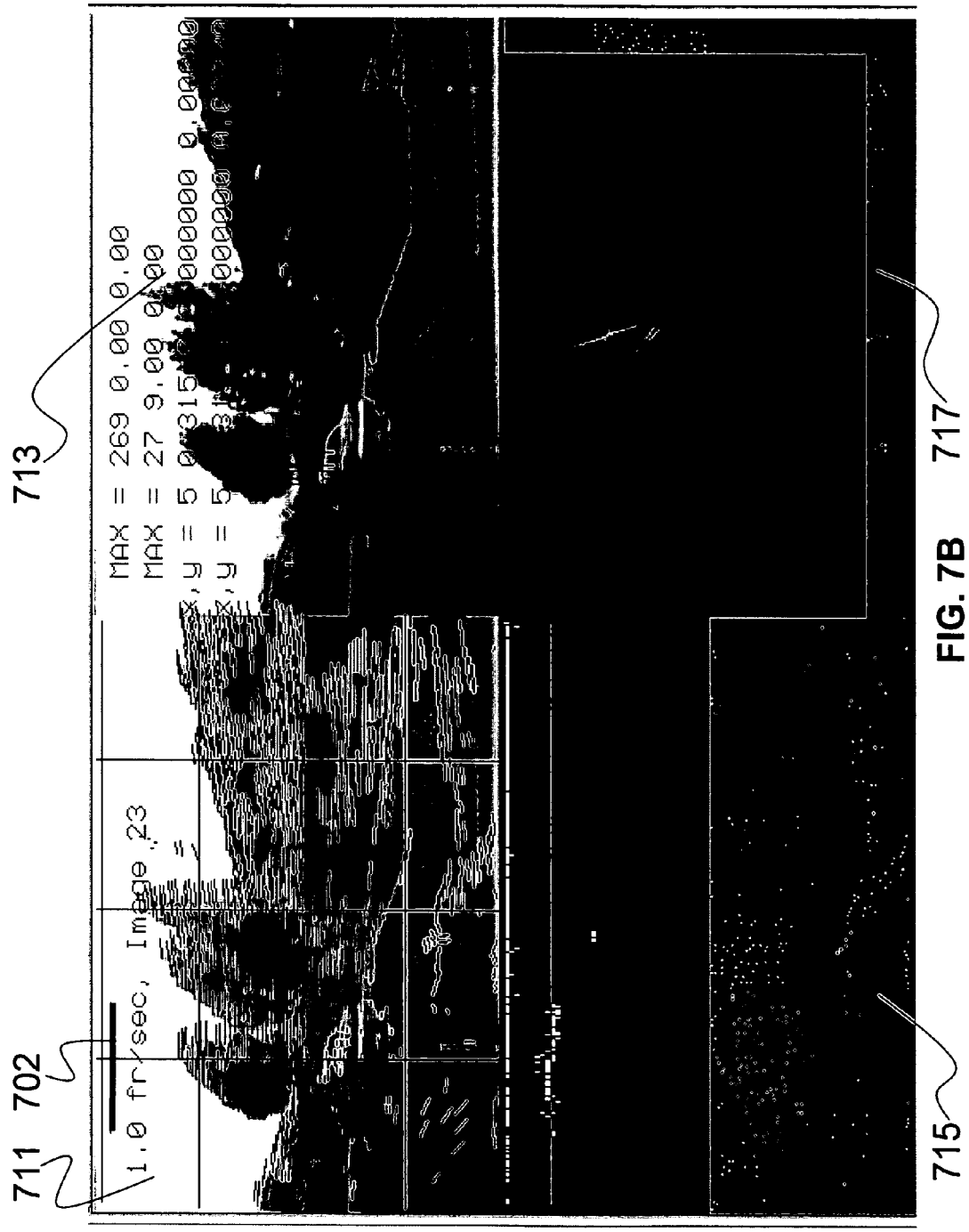
FIG. 7B is an exemplary sequence of two frames where the host was following the target at approximately twenty miles per hour; a Hough parameter space derived from the two frames; and linear segments in a flow histogram space.

As shown in FIG. 7A, for the two frames in the sequence 701 and 703, the Hough parameter space 705 and the linear segments in the flow histogram space 707 are shown. In FIG. 7A, the two frames 701 and 703 were taken when the target and host were diverging relative to each other. In FIG. 7B, the two frames 711 and 713 were taken when the host was following the target at approximately twenty miles per hour. The corresponding Hough parameter space 715 and linear segments in the flow histogram space 717 are also shown. An estimate of the object width 702 is plotted on the top left quadrant of the figures.

Figure 8A:
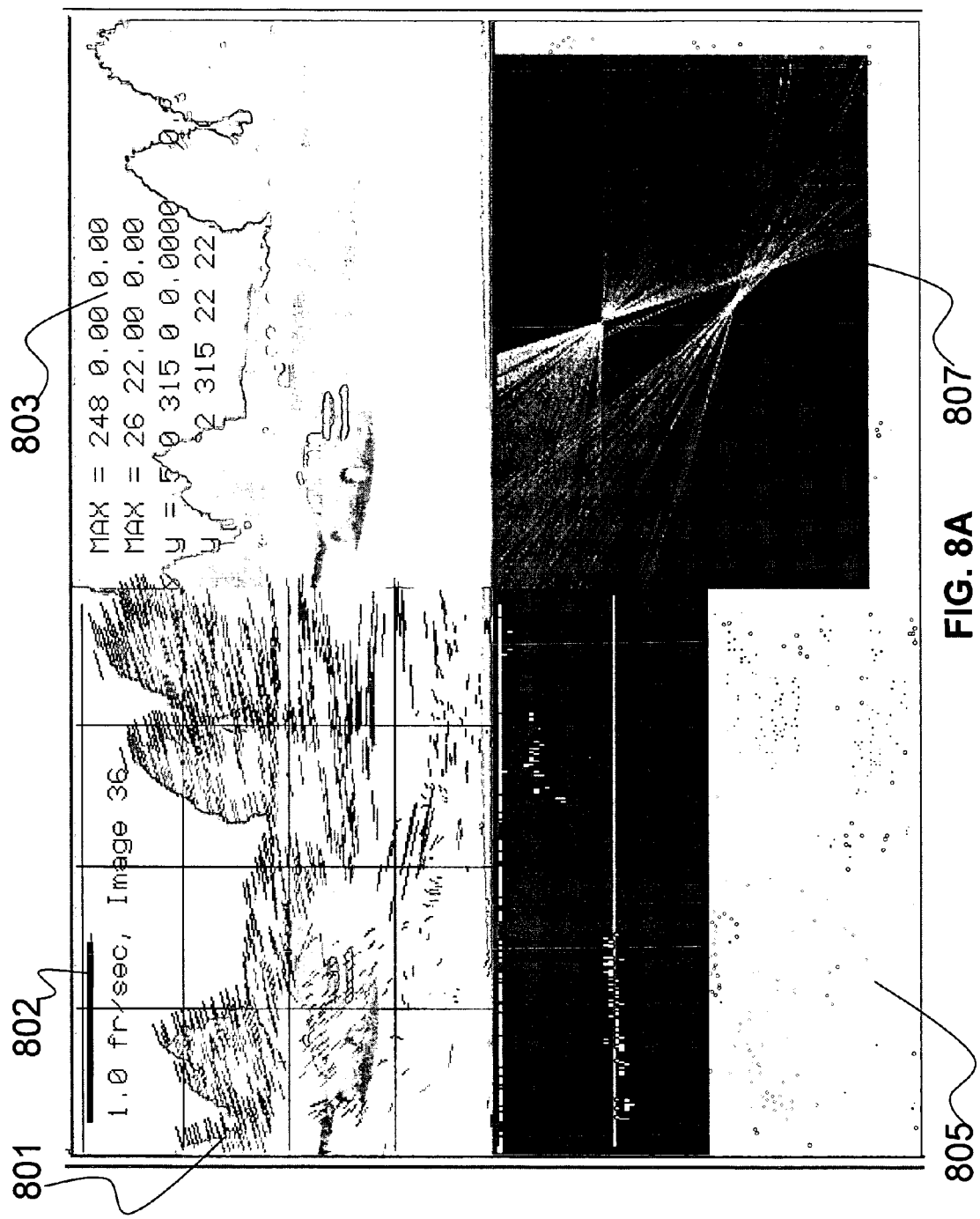
FIG. 8A is an exemplary sequence of two frames where the host was following the target as the target traveled in a circular path at approximately twenty miles per hour; a Hough parameter space derived from the two frames; and linear segments in a flow histogram space.
Figure 8B:
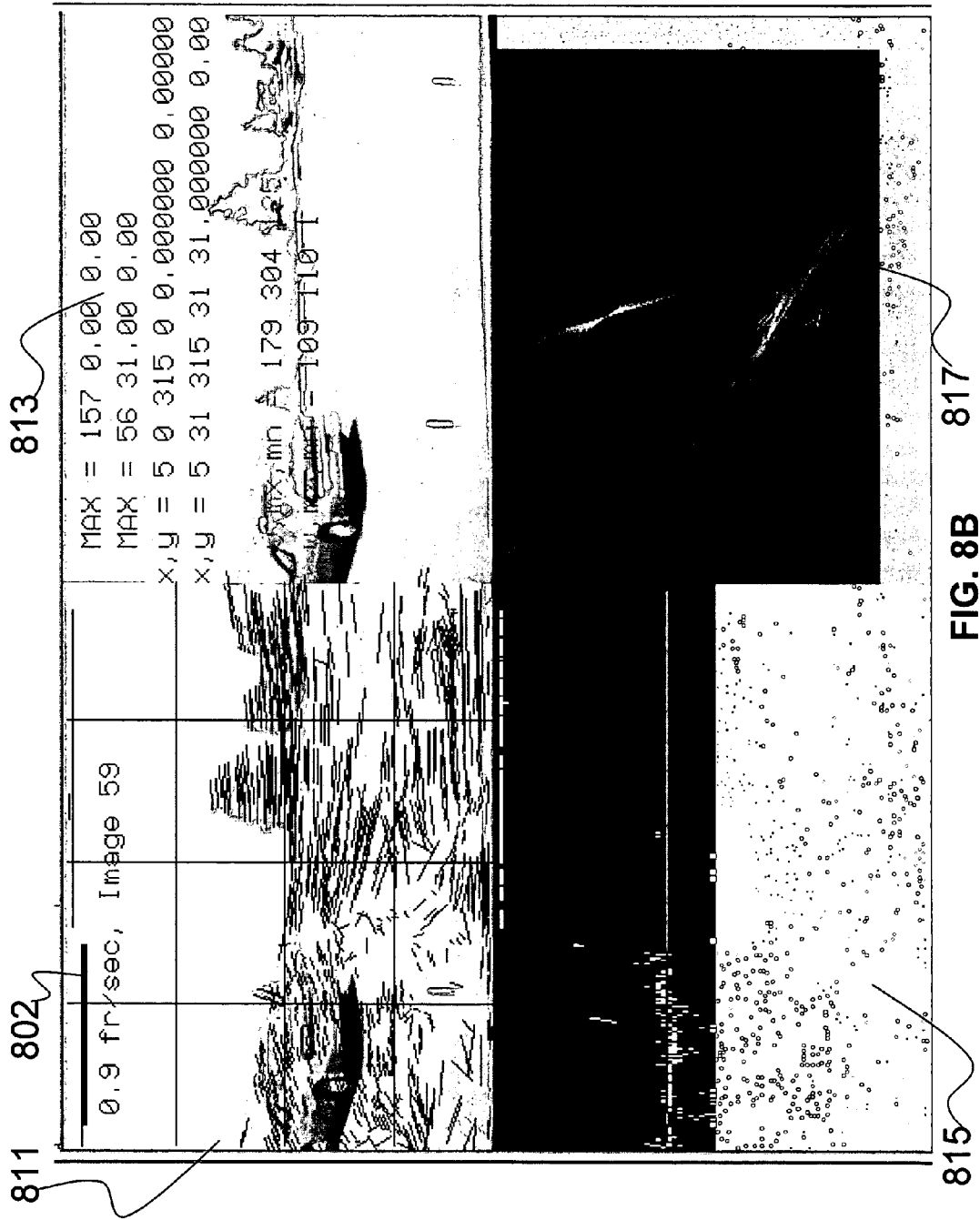
FIG. 8B is another exemplary sequence of two frames where the host was following the target as the target traveled in a circular path at approximately twenty miles per hour; a Hough parameter space derived from the two frames; and linear segments in a flow histogram space.

In FIG. 8A, for the two frames in the sequence 801 and 803, the Hough parameter space 805 and the linear segments in the flow histogram space 807 are shown. In FIG. 8A, the two frames 801 and 803 were taken when the host was following the target, as the target moved in a circular path at approximately twenty miles per hour. As shown in FIG. 8B, the two frames in sequence 811 and 813 illustrate the performance of the system and method in another situation. The corresponding Hough parameter space 815 and linear segments in the flow histogram space 817 are also shown. An estimate of the object width 802 is plotted on the top left quadrant of the figures.

Figure 9:
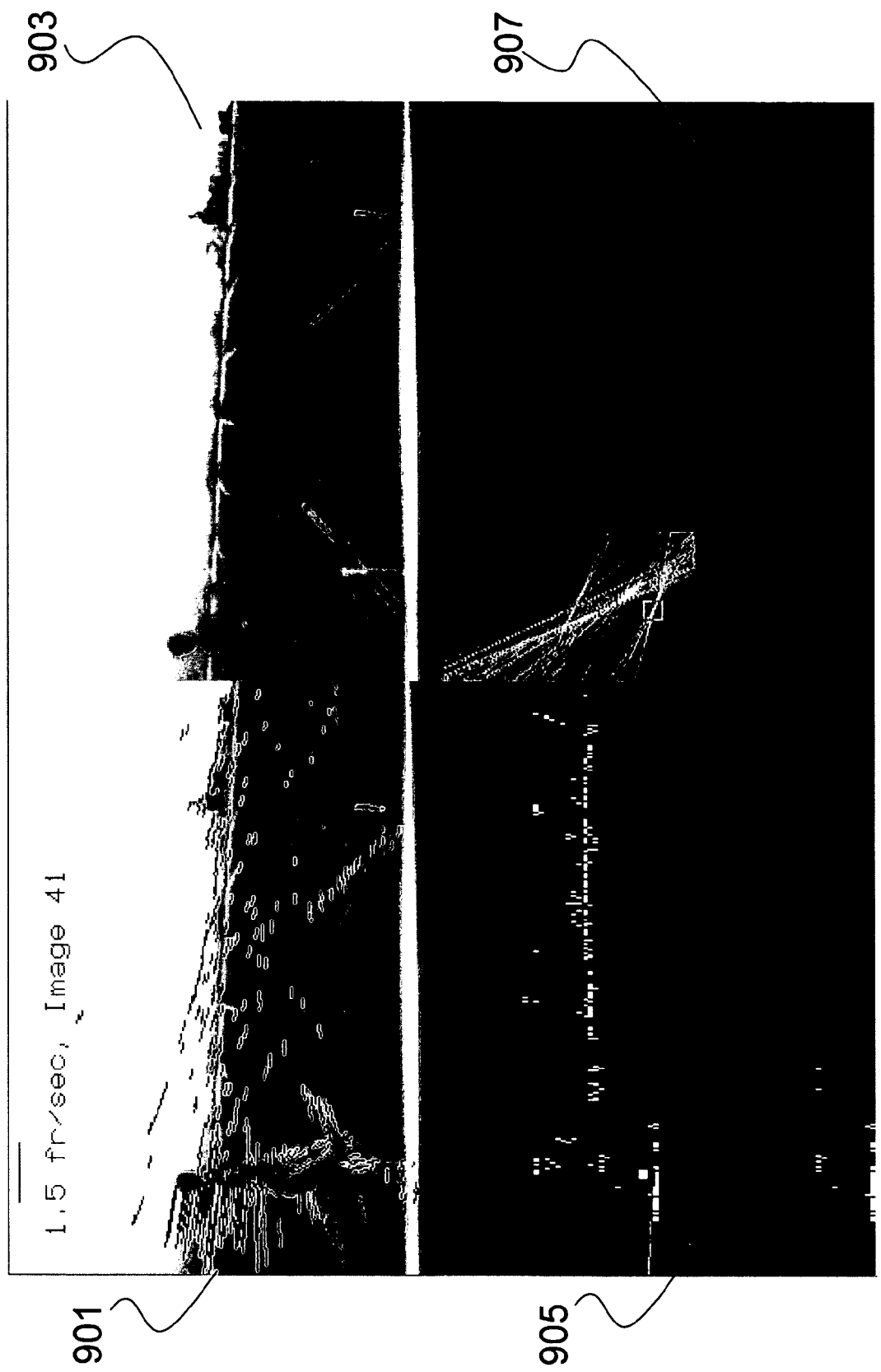
FIG. 9 is an exemplary sequence of two frames where a pedestrian was moving across a field of view while the host was also moving; a Hough parameter space derived from the two frames; and linear segments in a flow histogram space.

In FIG. 9, for the two frames in the sequence 901 and 903, the Hough parameter space 905 and the linear segments in the flow histogram space 907 are shown. In FIG. 9, the two frames 901 and 903 were taken when a pedestrian was moving across the scene while the host was also moving.

As discussed previously, although specific examples of motion between the host and target are depicted in FIGS. 5-9, it can be appreciated by one skilled in the art that FIGS. 5-9 are presented for illustrative purposes only and that the present invention can be employed to process various imagery in a variety of circumstances.

What is claimed is:

1. A computer-implemented method for processing imagery, the method comprising an act of causing a processor to perform operations of:

receiving data regarding a scene, the scene comprising an object having an object boundary representing an actual physical real-world dimension of the object;

computing flow vectors from the data;

generating a two-dimensional flow histogram space from the flow vectors, the two-dimensional flow histogram space comprising stacks of one-dimensional horizontal and vertical histograms;

wherein each one-dimensional horizontal and vertical histogram is generated from a row or a column in a single frame of a flow map;

finding a line segment within the flow histogram space, the line segment having a physical length;

associating the object in the scene with the line segment; and estimating the object boundary of the object, and thereby its actual physical real-world dimension, based on the physical length of the line segment.

2. The method of claim 1, wherein the act of computing comprises utilizing a pyramidal version of the Lucas-Kanade (LKP) approach to compute the flow vectors.

3. The method of claim 2, further comprising an act of operating a modified median filter on the flow histogram space to eliminate isolated non-zero bins.

4. The method of claim 3, wherein the act of finding a line segment is performed via a Hough transform.

5. The method of claim 4, wherein the act of estimating the dimension of the object is performed using heuristic models.

6. The method of claim 5, wherein in the act of computing flow vectors, the flow vectors are computed as horizontal components of flow.

7. The method of claim 6, wherein the act of generating flow histograms, the histograms are generated as horizontal projection histograms.

8. The method of claim 6, wherein the act of generating flow histograms, the histograms are generated as vertical projection histograms.

9. The method of claim 5, wherein in the act of computing flow vectors, the flow vectors are computed as vertical components of flow.

10. The method of claim 9, wherein the act of generating flow histograms, the histograms are generated as horizontal projection histograms.

11. The method of claim 9, wherein the act of generating flow histograms, the histograms are generated as vertical projection histograms.

12. The method of claim 1, further comprising an act of operating a modified median filter on the flow histogram space to eliminate isolated non-zero bins.

13. The method of claim 1, wherein the act of finding a line segment is performed via a Hough transform.

14. The method of claim 1, wherein the act of estimating the dimension of the object is performed using heuristic models.

15. The method of claim 1, wherein in the act of computing flow vectors, the flow vectors are computed as horizontal components of flow.

16. The method of claim 15, wherein the act of generating flow histograms, the histograms are generated as horizontal projection histograms.

17. The method of claim 15, wherein the act of generating flow histograms, the histograms are generated as vertical projection histograms.

18. The method of claim 1, wherein in the act of computing flow vectors, the flow vectors are computed as vertical components of flow.

19. The method of claim 18, wherein the act of generating flow histograms, the histograms are generated as horizontal projection histograms.

20. The method of claim 18, wherein the act of generating flow histograms, the histograms are generated as vertical projection histograms.

21. A system for processing imagery, the system comprising:
an input for receiving data regarding a scene, the scene comprising an object having an object boundary representing an actual physical real-world dimension of the object;
a processor configured to:
compute flow vectors from the data;
generate a two-dimensional flow histogram space from the flow vectors, the two-dimensional flow histogram space comprising stacks of one-dimensional horizontal and vertical histograms;
wherein each one-dimensional horizontal and vertical histogram is generated from a row or a column in a single frame of a flow map;
find a line segment within the flow histogram space, the line segment having a physical length;
associate the object in the scene with the line segment; and
estimate the object boundary of the object, and thereby its actual physical real-world dimension, based on the physical length of the line segment.

22. The system of claim 21, wherein when computing flow vectors from the data, the processor utilizes a pyramidal version of the Lucas-Kanade (LKP) approach to compute the flow vectors.

23. The system of claim 22, wherein the processor is further configured to operate a modified median filter on the flow histogram space to eliminate isolated non-zero bins.

24. The system of claim 23, wherein when finding a line segment, the line segment is found via a Hough transform.

25. The system of claim 24, wherein when estimating the dimension of the object, dimension of the object is estimated using heuristic models.

26. The system of claim 25, wherein when computing flow vectors, the flow vectors are computed as horizontal components of flow.

27. The system of claim 26, wherein when generating flow histograms, the histograms are generated as horizontal projection histograms.

28. The system of claim 26, wherein when generating flow histograms, the histograms are generated as vertical projection histograms.

29. The system of claim 25, wherein when computing flow vectors, the flow vectors are computed as vertical components of flow.

30. The system of claim 29, wherein when generating flow histograms, the histograms are generated as horizontal projection histograms.

31. The system of claim 29, wherein when generating flow histograms, the histograms are generated as vertical projection histograms.

32. The system of claim 21, wherein the processor is further configured to operate a modified median filter on the flow histogram space to eliminate isolated non-zero bins.

33. The system of claim 21, wherein when finding a line segment, the line segment is found via a Hough transform.

34. The system of claim 21, wherein when estimating the dimension of the object, dimension of the object is estimated using heuristic models.

35. The system of claim 21, wherein when computing flow vectors, the flow vectors are computed as horizontal components of flow.

36. The system of claim 35, wherein when generating flow histograms, the histograms are generated as horizontal projection histograms.

37. The system of claim 35, wherein when generating flow histograms, the histograms are generated as vertical projection histograms.

38. The system of claim 21, wherein when computing flow vectors, the flow vectors are computed as vertical components of flow.

39. The system of claim 38, wherein when generating flow histograms, the histograms are generated as horizontal projection histograms.

40. The system of claim 38, wherein when generating flow histograms, the histograms are generated as vertical projection histograms.

41. A computer program product for processing imagery, the computer program product comprising computer-readable instructions encoded on a computer readable medium for causing a computer to:
receive data regarding a scene, the scene comprising an object having an object boundary representing an actual physical real-world dimension of the object;
compute flow vectors from the data;
generate a two-dimensional flow histogram space from the flow vectors, the two-dimensional flow histogram space comprising stacks of one-dimensional horizontal and vertical histograms;
wherein each one-dimensional horizontal and vertical histogram is generated from a row or a column in a single frame of a flow map;
find a line segment within the flow histogram space, the line segment having a physical length;
associate the object in the scene with the line segment; and estimate the object boundary of the object, and thereby its actual physical real-world dimension, based on the physical length of the line segment.

42. The computer program product of claim 41, wherein the computer-readable instructions for causing the computer to compute flow vectors from the data, are configured to utilize a pyramidal version of the Lucas-Kanade (LKP) approach to compute the flow vectors.

43. The computer program product of claim 42, wherein the computer program product further comprises computer-readable instructions to operate a modified median filter on the flow histogram space to eliminate isolated non-zero bins.

44. The computer program product of claim 43, wherein the computer-readable instructions for causing the computer to find a line segment are configured to find the line segment via a Hough transform.

45. The computer program product of claim 44, wherein the computer-readable instructions for causing the computer to estimate the dimension of the object are configured to estimate the dimension of the object using heuristic models.

46. The computer program product of claim 45, wherein the computer-readable instructions for causing the computer to compute flow vectors from the data are configured to compute the flow vectors as horizontal components of flow.

47. The computer program product of claim 46, wherein the computer-readable instructions for causing the computer to generate flow histograms are configured to generate the flow histograms as horizontal projection histograms.

48. The computer program product of claim 46, wherein the computer-readable instructions for causing the computer to generate flow histograms are configured to generate the flow histograms as vertical projection histograms.

49. The computer program product of claim 45, wherein the computer-readable instructions for causing the computer to compute flow vectors from the data, are configured to compute the flow vectors as vertical components of flow.

50. The computer program product of claim 49, wherein the computer-readable instructions for causing the computer to generate flow histograms are configured to generate the flow histograms as horizontal projection histograms.

51. The computer program product of claim 49, wherein the computer-readable instructions for causing the computer to generate flow histograms are configured to generate the flow histograms as vertical projection histograms.

52. The computer program product of claim 41, wherein the computer program product further comprises computer-readable instructions to operate a modified median filter on the flow histogram space to eliminate isolated non-zero bins.

53. The computer program product of claim 41, wherein the computer-readable instructions for causing the computer to find a line segment are configured to find the line segment via a Hough transform.

54. The computer program product of claim 41, wherein the computer-readable instructions for causing the computer to estimate the dimension of the object are configured to estimate the dimension of the object using heuristic models.

55. The computer program product of claim 41, wherein the computer-readable instructions for causing the computer to compute flow vectors from the data are configured to compute the flow vectors as horizontal components of flow.

56. The computer program product of claim 55, wherein the computer-readable instructions for causing the computer to generate flow histograms are configured to generate the flow histograms as horizontal projection histograms.

57. The computer program product of claim 55, wherein the computer-readable instructions for causing the computer to generate flow histograms are configured to generate the flow histograms as vertical projection histograms.

58. The computer program product of claim 41, wherein the computer-readable instructions for causing the computer to compute flow vectors from the data, are configured to compute the flow vectors as vertical components of flow.

59. The computer program product of claim 58, wherein the computer-readable instructions for causing the computer to generate flow histograms are configured to generate the flow histograms as horizontal projection histograms.

60. The computer program product of claim 58, wherein the computer-readable instructions for causing the computer to generate flow histograms are configured to generate the flow histograms as vertical projection histograms.

* * * * *